United States Patent
Romero et al.

(10) Patent No.: US 12,379,337 B2
(45) Date of Patent: Aug. 5, 2025

(54) DEVICE AND METHOD FOR MEASURING ANGLES OF ORIENTATION OF AN X-RAY IMAGING SYSTEM

(71) Applicants: SAFRAN, Paris (FR); Association pour la Recherche et le Développement des Méthodes et Processus Industriels, Paris (FR)

(72) Inventors: Edward Romero, Moissy-Cramayel (FR); Alexiane Arnaud, Moissy-Cramayel (FR); Clément Remacha, Moissy-Cramayel (FR); Henry Proudhon, Moissy-Cramayel (FR)

(73) Assignees: SAFRAN/Association pour la Recherche et le, Paris (FR); Développement des Méthodes et Processus Industriels, Paris (FR)

( * ) Notice: Subject to any disclaimer, the term of this patent is extended or adjusted under 35 U.S.C. 154(b) by 412 days.

(21) Appl. No.: 17/756,679

(22) PCT Filed: Nov. 26, 2020

(86) PCT No.: PCT/FR2020/052186
§ 371 (c)(1),
(2) Date: May 31, 2022

(87) PCT Pub. No.: WO2021/111064
PCT Pub. Date: Jun. 10, 2021

(65) Prior Publication Data
US 2023/0003673 A1 Jan. 5, 2023

(30) Foreign Application Priority Data
Dec. 2, 2019 (FR) ...................... 1913620

(51) Int. Cl.
*G01N 23/2055* (2018.01)
*G01N 23/20025* (2018.01)

(52) U.S. Cl.
CPC ... *G01N 23/2055* (2013.01); *G01N 23/20025* (2013.01); *G01N 2223/316* (2013.01); *G01N 2223/401* (2013.01)

(58) Field of Classification Search
CPC ....... G01N 2223/303; G01N 2223/316; G01N 2223/401; G01N 23/20008; G01N 23/20025; G01N 23/2055
See application file for complete search history.

(56) References Cited

U.S. PATENT DOCUMENTS

| | | | | |
|---|---|---|---|---|
| 2003/0012335 A1* | 1/2003 | Yokoyama | ........... | G01N 23/207 378/78 |
| 2004/0103130 A1* | 5/2004 | Ivanisevic | .......... | G01N 23/2055 708/200 |

(Continued)

OTHER PUBLICATIONS

Search Report issued in French Patent Application No. 1913620 dated Oct. 28, 2020.

(Continued)

*Primary Examiner* — David J Makiya
*Assistant Examiner* — Soorena Kefayati
(74) *Attorney, Agent, or Firm* — McDonald Hopkins LLC

(57) ABSTRACT

A device and method for measuring angles of orientation of an x-ray imaging system including an x-ray source, an x-ray detector and a sample holder arranged to receive a sample to be analysed. The method includes: emitting a polychromatic x-ray beam through a reference sample installed on the sample holder in order to form a diffraction pattern on the sensing area of the x-ray detector, generating, with the x-ray detector, an observed image comprising the diffraction pattern, and determining the orientation of the x-ray source and the orientation of the x-ray detector by comparing the (Continued)

observed image with at least one target image comprising a diffraction pattern obtained for the reference sample with preset orientations of the x-ray source and of the x-ray detector.

14 Claims, 3 Drawing Sheets

(56) References Cited

U.S. PATENT DOCUMENTS

| | | | | |
|---|---|---|---|---|
| 2010/0124315 A1* | 5/2010 | Harding | ............... | G01V 5/00 378/207 |
| 2010/0237242 A1* | 9/2010 | Schwarzer | ............ | G01N 23/207 250/309 |
| 2013/0206968 A1* | 8/2013 | Rouviere | ............... | G01N 23/00 250/216 |
| 2014/0029726 A1* | 1/2014 | Yasukawa | ................. | G01L 1/25 378/72 |
| 2014/0247920 A1* | 9/2014 | Marks | ............. | G01N 23/20008 378/87 |
| 2015/0117611 A1* | 4/2015 | Ren | ................. | G01N 23/20025 422/552 |
| 2015/0276629 A1* | 10/2015 | Ruf | ................. | G01N 23/20075 378/73 |
| 2016/0202193 A1* | 7/2016 | Hench | ............. | G01N 23/20008 702/85 |
| 2017/0176355 A1* | 6/2017 | He | ............................ | G06T 5/00 |
| 2017/0343490 A1* | 11/2017 | He | ....................... | G01N 23/207 |
| 2018/0076005 A1* | 3/2018 | Haas | ...................... | G01R 29/08 |
| 2018/0372658 A1* | 12/2018 | He | ..................... | G01N 23/2055 |
| 2019/0302039 A1* | 10/2019 | Artemiev | ......... | G01N 23/20008 |
| 2019/0323976 A1* | 10/2019 | Vinshtein | ......... | G01N 23/20091 |
| 2020/0003708 A1* | 1/2020 | Kobayashi | ........... | G01N 23/207 |
| 2020/0041427 A1* | 2/2020 | Mayo | ............... | G01N 23/20091 |
| 2022/0230844 A1* | 7/2022 | Dobashi | ................ | H01J 37/265 |

OTHER PUBLICATIONS

International Search Report dated Mar. 12, 2021 issued in Patent Application No. PCT/FR2020/052186.

Written Opinion dated Mar. 12, 2021 issued in Patent Application No. PCT/FR2020/052186.

Zhang, Chenglu, et al., "Alignment of sample position and rotation during in situ synchrotron X-ray micro-diffraction experiments using a Laue cross-correlation approach", Journal of Applied Crystallography, Sep. 20, 2019, pp. 1119-1127, vol. 52, No. 5, United States, XP055743368.

Hart, Michael L., et al., "Complete elliptical ring geometry provides energy and instrument calibration for synchrotron-based two-dimensional X-ray diffraction", Journal of Applied Crystallography, Sep. 18, 2013, pp. 1249-1260, vol. 46, No. 5, Denmark, XP055744789.

Hammersley, A.P., et al., "Two-Dimensional Detector Software: From Real Detector to Idealised Image or Two-Theta Scan", High Pressure Research, Apr. 1996, pp. 235-248, vol. 14, No. 4-6, United States, XP055362474.

Fay, B. et al., "Optical alignment for submicrons x-ray lithography", Journal of Vacuum Science and Technology 16, 1954 (1979), pp. 1954-1958, http://dx.doi.org/10.1116/1.570364.

* cited by examiner

DEVICE AND METHOD FOR MEASURING ANGLES OF ORIENTATION OF AN X-RAY IMAGING SYSTEM

This is the National Stage of PCT international application PCT/FR2020/052186, filed on Nov. 26, 2020 entitled "DEVICE AND METHOD FOR MEASURING ANGLES OF ORIENTATION OF AN X-RAY IMAGING SYSTEM", which claims the priority of French Patent Application No. 1913620 filed Dec. 2, 2019, both of which are incorporated herein by reference in their entirety.

TECHNICAL FIELD

The invention is in the field of x-ray imaging and, more specifically, in the field of the alignment of optical elements of an x-ray imaging system. It relates to a device and method for measuring angles of orientation of an x-ray imaging system comprising an x-ray source, an x-ray detector and a sample holder arranged to receive a sample to be analysed, the sample holder being placed between the x-ray source and the x-ray detector.

The invention particularly applies to x-ray imaging systems used for controlling single crystal parts by the Laue method. Such a system is based on the study of a diffraction pattern generated on the sensor by the diffraction of a polychromatic x-ray beam during its passage through a single crystal part. In particular, the shape and the position of the spots constituting the diffraction pattern may be compared with those of a reference set of diffraction patterns, in such a way as to determine the crystal orientation of the single crystal part. Nevertheless, the invention applies to any x-ray imaging system comprising an x-ray source and an x-ray detector of which it is desired to determine the alignment in relation to a sample to be imaged.

Prior Art

In any x-ray imaging system, the correct alignment of its various optical elements is necessary for obtaining a desired image resolution. At the very least, the orientation of the optical elements in relation to the optical axis of the system must be known with a sufficient accuracy to make it possible to reconstruct the image with the desired resolution. Most of the techniques that make it possible to determine the alignment of an x-ray imaging system require the use of dedicated equipment, rendered unnecessary during the operational image acquisition phase. By way of example, laser pointer systems may be used, such as described in B. Fay, J. Trotel and A. Frichet, Optical alignment for submicrons x-ray lithography, Journal of Vacuum Science and Technology.

The alignment systems may also be based on the use of ghosts specially designed for this task. A ghost is placed on the path of the x-ray beam, between the radiation source and the detector. In so far as the dimensions and the absorption properties of the ghost are known, the image generated by the detector makes it possible to know the relative position of the radiation source, of the ghost and of the detector. The main drawback of this technique is that the alignment of the imaging system is determined with a limited accuracy by the spatial resolution of the detector.

The U.S. Pat. No. 6,453,006 B1 describes techniques for calibration and alignment of x-ray reflectometric systems comprising an x-ray source, a reflector, a sample to be tested and a detector. It particularly describes a method for aligning the reflector with the x-ray source consisting in disposing a fine wire between these elements to generate a shadow and in orienting the reflector so as to obtain the smallest possible width of the shadow. Here again, the accuracy of the alignment is limited by the spatial resolution of the detector.

The aforementioned solutions for aligning the optical elements of an x-ray imaging system therefore do not give entire satisfaction. A first aim of the invention is to propose a technique to make it possible to align an x-ray imaging system that only requires a limited number of optical elements in addition to those useful for the phase for measuring a sample. A second aim of the invention is to propose a technique making it possible to obtain a better accuracy of the alignment, in particular greater than the resolution of the x-ray detector of the imaging system.

DESCRIPTION OF THE INVENTION

To this end, the invention is based on the use of the Laue method. This method is used not to study the crystal structure of a sample, but to determine the orientation of the optical elements of an x-ray imaging system with the aid of a reference sample the crystal structure and the orientation of which are known. The method according to the invention comprises installing the reference sample on a sample holder, emitting an x-ray beam passing through the reference sample and forming a diffraction pattern on a detector of the x-ray imaging system, generating an image comprising the diffraction pattern, and determining the orientation of the x-ray beam and that of the detector by comparing the diffraction pattern obtained with at least one target image including a diffraction pattern corresponding to known orientations of the x-ray beam and of the detector.

More specifically, the object of the invention is a method for measuring angles of orientation of an x-ray imaging system, the x-ray imaging system comprising an x-ray source, an x-ray detector and a sample holder arranged to receive a sample to be analysed. The x-ray imaging system is arranged so that the x-ray source can emit a polychromatic x-ray beam along a main axis of propagation passing through the sample to be analysed and reaching a sensing area of the x-ray detector. An optical axis of the x-ray imaging system is defined between a centre of emission of the x-ray source and the x-ray detector. The method comprises the steps of:
  emitting, from the x-ray source, a polychromatic x-ray beam along the main axis of propagation, so that the x-ray beam passes through a reference sample installed on the sample holder and forms a diffraction pattern on the sensing area of the x-ray detector,
  generating, with the x-ray detector, an observed image, the observed image comprising the diffraction pattern, and
  determining the orientation of the main axis of propagation and the orientation of the sensing area of the x-ray detector by comparing the observed image with at least one target image, the target image including a diffraction pattern obtained for the reference sample with a preset orientation of the main axis of propagation and a preset orientation of the sensing area of the x-ray detector.

Each diffraction pattern is formed by a set of luminous spots the shapes, the dimensions and the position of which in a given plane depend on the orientation of the main axis of propagation of the x-ray source, on the orientation of the sensing area of the x-ray detector and on the diffraction properties of the reference sample.

The optical axis of the x-ray imaging system is denoted X. It defines, with a second axis, denoted Y, and a third axis, denoted Z, a direct orthogonal mark XYZ. The plane passing through the axes X and Y is denoted "plane XY"; the plane passing through the axes X and Z is called "plane XZ"; and the plane passing through the axes Y and Z is called "plane YZ". In addition to passing through the centre of emission of the x-ray source, the optical axis X may pass though the centre of the x-ray detector or close to this point.

The x-ray source typically emits an x-ray beam of conical shape along a main axis of propagation $X_s$, the centre of emission of the x-ray source corresponding to the top of the cone and the main axis of propagation $X_s$ corresponding to the axis of the cone. The main axis of propagation $X_s$ forms an angle $\xi_{xy}$ with the optical axis X in the plane XY, that is to say by rotation about the axis Z, and an angle with the optical axis X in the plane XZ, that is to say by rotation about the axis Y.

The x-ray detector may comprise a set of sensing elements disposed in a plane $Y_d Z_d$ substantially orthogonal to the optical axis X. The orientation of the x-ray detector is defined in a direct orthogonal mark $X_d Y_d Z_d$. The mark $X_d Y_d Z_d$ forms, in relation to the mark XYZ, an angle α by rotation about the axis Z, an angle β by rotation about the axis Y and an angle γ by rotation about the axis X. It should be noted that the x-ray detector may also comprise a set of sensing elements disposed linearly along an axis $Y_d$ or $Z_d$ and displaced linearly along an orthogonal axis $Z_d$ or $Y_d$, respectively, in order to reconstitute the plane $Y_d Z_d$.

According to a first embodiment, the step of determining the orientation of the main axis of propagation $X_s$ and the orientation of the sensing area of the x-ray detector comprises comparing the observed image with a set of target images, each target image showing a diffraction pattern for a preset orientation of the main axis of propagation and a preset orientation of the sensing area of the x-ray detector, said orientations being different for each target image.

The orientation of the main axis of propagation $X_s$ and that of the sensing area of the x-ray detector may particularly correspond to the respective orientations for the target image the diffraction pattern of which is the most similar to the diffraction pattern of the observed image. The criterion of similarity between the diffraction pattern of the target image and the diffraction pattern of the observed image comprises for example an average distance between each spot in the observed image and the corresponding spot in the target image.

According to a second embodiment, the step of determining the orientation of the main axis of propagation and the orientation of the sensing area of the x-ray detector comprises the substeps of:
  determining a similarity parameter representative of a degree of similarity between the diffraction pattern of the observed image and the diffraction pattern of a current target image for a given orientation of the main axis of propagation $X_s$ and a given orientation of the sensing area of the x-ray detector,
  comparing the similarity parameter with a similarity threshold,
  when the similarity parameter is less than the similarity threshold, identifying the given orientation of the main axis of propagation $X_s$ and the given orientation of the sensing area of the x-ray detector as effective orientations of the main axis of propagation $X_s$ and of the sensing area of the x-ray detector,
  when the similarity parameter is greater than or equal to the similarity threshold, generating a new current target image, at least one of the given orientations for the current target image being different from the corresponding given orientation for the preceding target image, and reiterating the preceding substeps until the similarity parameter is less than the similarity threshold.

Each target image may be determined by a digital modelling of the diffraction generated by the reference sample installed on the sample holder, for a given orientation of the main axis of propagation and a given orientation of the sensing area of the x-ray detector. Laue diffraction modelling software may be used for this purpose. The Laue diffraction modelling software is for example the PyMicro software, developed by Henry Proudhon. This software is based on VTK and python libraries.

The method for measuring angles of orientation of an x-ray imaging system may further comprise, prior to the step of emitting the x-ray beam, a step of installing the reference sample on the sample holder.

The sample holder may include a support surface to receive alternately the sample to be analysed or the reference sample. The support surface may define, by convention, a reference plane. This reference plane may be the plane XZ.

The reference sample may be formed in a single crystal material, for example a single crystal silicon. It is preferably placed on the sample holder so that one of its crystal surfaces is parallel to the plane YZ.

Another object of the invention is a device for measuring angles of orientation of an x-ray imaging system, the x-ray imaging system comprising an x-ray source, an x-ray detector and a sample holder arranged to receive a sample to be analysed. The x-ray imaging system is arranged so that the x-ray source can emit a polychromatic x-ray beam along a main axis of propagation passing through the sample to be analysed and reaching a sensing area of the x-ray detector. An optical axis of the x-ray imaging system is defined between a centre of the x-ray source and the x-ray detector. The device comprises a processing unit configured to:
  emit, by the x-ray source, a polychromatic x-ray beam along the main axis of propagation, so that the x-ray beam passes through a reference sample installed on the sample holder and forms a diffraction pattern on the sensing area of the x-ray detector,
  generate, with the x-ray detector, an observed image, the observed image comprising the diffraction pattern, and
  determine the orientation of the main axis of propagation and the orientation of the sensing area of the x-ray detector by comparing the observed image with at least one target image, the target image including a diffraction pattern obtained for the reference sample with a preset orientation of the main axis of propagation and a preset orientation of the sensing area of the x-ray detector.

The device may in addition include a first diaphragm placed upstream of the sample holder, and arranged to limit a transverse area of the x-ray beam. The transverse area is defined in the plane YZ. The limitation of the transverse area makes it possible to ensure that the entire x-ray beam reaching the x-ray detector has indeed passed through the reference sample. Thus, the first diaphragm may include an opening the dimensions of which in the plane YZ are smaller than the corresponding dimensions of the reference sample.

The device for measuring angles of orientation of an x-ray imaging system may further include a second diaphragm and/or a collimator placed between the x-ray source and the first diaphragm, arranged to obtain a collimated x-ray beam at the sample holder. The second diaphragm and/or the collimator is particularly of interest when the distance between the x-ray source and the x-ray detector is greater than or equal to 30 cm.

According to a particular embodiment, the device further comprises a shutter element placed downstream of the sample holder, and arranged to prevent a portion of the beam having passed through the reference sample without being diffracted, from reaching the sensing area of the x-ray detector. The shutter element thus makes it possible to form, on the x-ray detector, an image only comprising the diffraction pattern, and not the transmitted portion of the x-ray beam. The intensity range of the x-ray beam received is then reduced by comparing the case where the transmitted portion of the x-ray beam is also received by the detector. The result is a greater dynamic of the observed intensities of the spots (for the sampling), and therefore a limitation of the electronic noise and a better resolution for measuring the intensity of the image.

The shutter element is formed in an x-ray opaque material. It is for example made of lead.

In the presence of the first diaphragm, the shutter element preferably has dimensions, in the plane YZ, larger than the corresponding dimensions of the opening of the first diaphragm.

The device for measuring angles of orientation of an x-ray imaging system may further include the reference sample. As indicated above, the reference sample may be formed in a single crystal material, for example a single crystal silicon.

The optical elements of the device for measuring angles of orientation of an x-ray imaging system, namely the first diaphragm, the second diaphragm, the collimator and/or the shutter element, may be integral with one another or form independent separate elements.

Finally, another object of the invention is a computer program comprising instructions that, when the program is executed by a computer, lead it to implement the method for measuring angles of orientation of an x-ray imaging system as described above.

BRIEF DESCRIPTION OF THE DRAWINGS

Other features, details and advantages of the invention will become apparent upon reading the following description, given only by way of example and made with reference to the appended drawings wherein.

DETAILED DESCRIPTION

Figure 1:
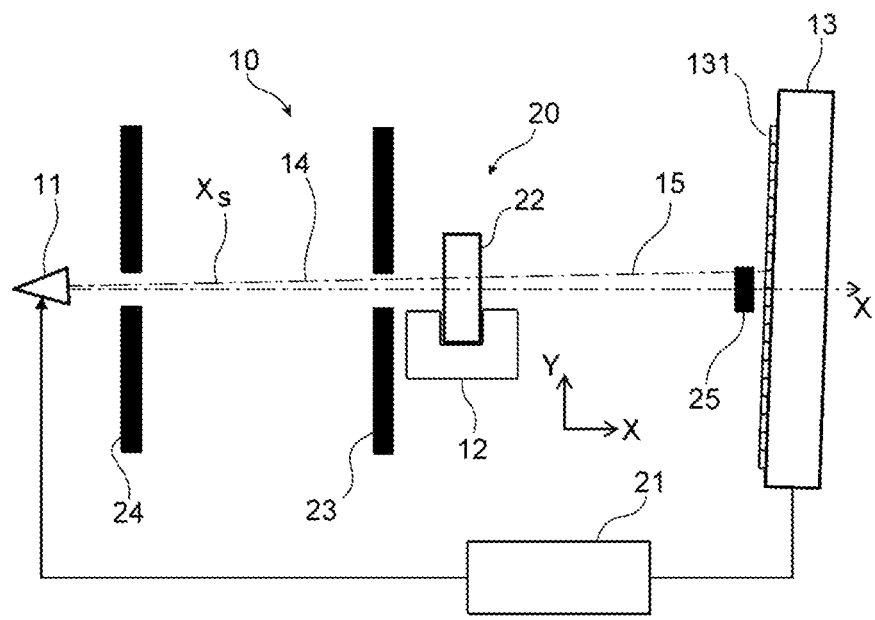
FIG. 1 schematically shows an example of x-ray imaging system and of device for measuring angles of orientation of this system.

FIG. 1 schematically shows an example of x-ray imaging system and of device for measuring angles of orientation of an x-ray imaging system according to the invention. The x-ray imaging system 10 comprises an x-ray source 11, a sample holder 12 and an x-ray detector 13. The x-ray source 11 is arranged to emit a polychromatic x-ray beam 14 along a main axis of propagation $X_s$. The x-ray beam 14 has a conical shape, the centre of emission of the source 11 corresponding to the top of the cone and the main axis of propagation $X_s$ corresponding to the axis of the cone. The sample holder 12 is positioned between the source 11 and the detector 13. It is arranged to receive a sample to be analysed by the x-ray imaging system and to hold it in a position making it possible to be passed through by the x-ray beam 14. Bearing surfaces of the sample holder 12 form reference planes defining a direct orthogonal mark XYZ of axes X, Y and Z. The axis X, called "optical axis", passes through a centre of emission of the source 11. The x-ray detector 13 is a plane detector. It comprises a plurality of x-ray sensing elements, the sensing elements being disposed in a plane $Y_dZ_d$ substantially parallel to the plane YZ and forming a sensing area 131.

Figure 2:
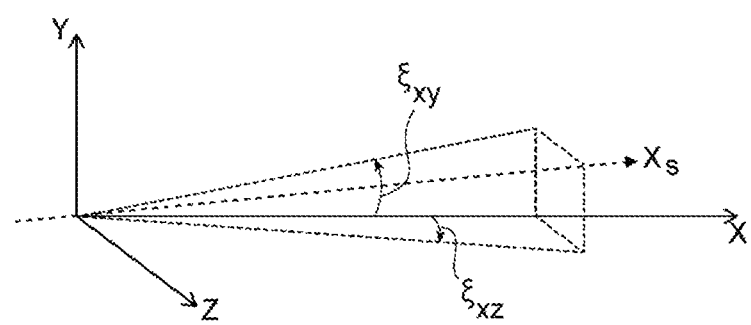
FIG. 2 shows the reference orthogonal mark and the orientation of the main axis of propagation of the x-ray source of the x-ray imaging system in relation to this orthogonal mark.

FIG. 2 shows the orthogonal mark XYZ related to the sample holder 12 and the main axis of propagation $X_s$ of the x-ray source 11. The main axis of propagation $X_s$ forms an angle $\xi_{xy}$ with the optical axis X in the plane XY, that is to say by rotation about the axis Z, and an angle $\xi_{xz}$ with the optical axis X in the plane XZ, that is to say by rotation about the axis Y.

Figure 3:
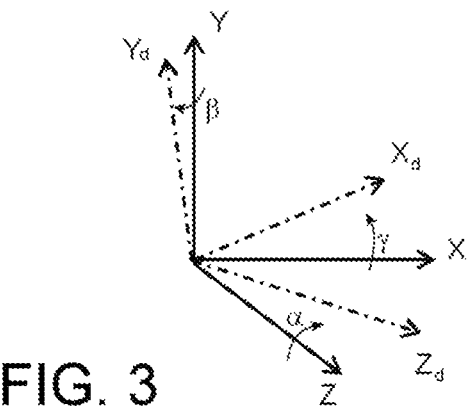
FIG. 3 shows the reference orthogonal mark and the orientation of the orthogonal mark related to the x-ray detector of the x-ray imaging system in relation to this orthogonal mark.

FIG. 3 shows the orthogonal mark XYZ related to the sample holder 12 and the orthogonal mark $X_dY_dZ_d$ related to the x-ray detector 13. The passage of the mark XYZ to the mark $X_dY_dZ_d$ is performed by a rotation of axis Z with an angle α, a rotation of axis Y with an angle β and a rotation of axis X with an angle γ.

FIG. 1 is again considered. The device for measuring angles of orientation of an x-ray imaging system 20 comprises a processing unit 21, a reference sample 22, a first diaphragm 23, a second diaphragm 24 and a shutter element 25. The reference sample 22 is formed in a single crystal material, for example made of silicon. It is placed on the sample holder 12 so that one of its crystal surfaces is parallel to the plane YZ. When passing through the reference sample 22, the polychromatic x-ray beam 14 is partially diffracted and is called "diffracted beam 15". Indeed, in accordance with Bragg's Law, the wavelengths of the x-ray beam 14 that are in Bragg condition with crystal planes of the reference sample 22, generate constructive and destructive interferences, so that the x-ray beam is diffracted. The shape and the position of the diffracted beam 15 depend on the orientation of the x-ray source 11 and on the orientation of the reference sample 22. Insofar as the sample holder 12 and the reference sample 22 are used by convention to define the reference mark, the shape and the position of the diffracted beam 15 depend in practice on the angles $\xi_{xy}$ and $\xi_{xz}$. The projection of the diffracted beam 15 on the sensing area 131 of the detector 13 forms a diffraction pattern consisting of spots. The shape and the position of the spots of the diffraction pattern therefore depend on the orientation of the source 11, but also on the orientation of the detector 13, that is to say angles α, β and γ. The detector 13 is arranged to generate an image comprising the diffraction pattern thus formed on its sensing area 131. This image is called "observed image".

The processing unit 21 is arranged to synchronise the source 11 and the detector 13. In particular, it is arranged to emit the x-ray beam 14 by the source 11 and generate the observed image with the aid of the detector 13. The processing unit 21 is further arranged to determine, by an image processing applied on the observed image, the orientation of the source 11 and that of the detector 13. The image processing may comprise a first step wherein the position of the centroids of the diffraction spots is determined. Segmentation approaches combined with mass centre calculations may be used, just like deep-learning techniques using neural networks to distinguish the diffraction spots in images. The orientation of the source 11 and that of the detector 13 is subsequently determined in a second step by comparing the positions of the centroids of the diffraction spots in the observed image with the positions of the centroids of the diffraction spots in at least one reference image, called "target image". Said target image includes a diffraction pattern obtained for the reference sample 22 with a preset orientation (known) of the source 11 and a preset orientation (known) of the detector 13. The target image includes for example a diffraction pattern obtained with a source 11 and a detector 13 perfectly aligned with the reference sample 22, that is to say with a main axis of propagation $X_s$ parallel to the optical axis X and a mark $X_d Y_d Z_d$ combined with the mark XYZ. The determination of the orientation of the source 11 and of that of the detector 13 is described more precisely below, with reference to FIG. 4.

The first diaphragm 23 is placed upstream of the sample holder 12, for example as close as possible to the sample holder 12. It is arranged to limit a transverse area of the x-ray beam 14 in the plane XY. This limitation of area makes it possible to ensure that the entire x-ray beam reaching the detector 13 has effectively passed through the reference sample 22. The first diaphragm 23 includes for example an opening the dimensions of which in the plane YZ are smaller than the corresponding dimensions of the reference sample 22.

The second diaphragm 24 is placed between the source 11 and the first diaphragm 23. It is for example placed as close as possible to the source 11. It is arranged to obtain a collimated x-ray beam at the sample holder 12. The second diaphragm 24 is mainly of interest when the distance between the source 11 and the detector 13 is greater than or equal to 30 cm. This diaphragm 24 may advantageously be replaced with a collimator positioned so that its focal point is located at the centre of the source 11.

The shutter element 25 is placed downstream of the sample holder 12. It is for example placed as close as possible to the detector 13. The shutter element 25 is arranged to prevent a portion of the x-ray beam 14 having passed through the reference sample 22 without undergoing diffraction, from reaching the sensing area 131 of the detector 13. This portion of the x-ray beam 14, if it is not blocked, would form a central spot of relatively high intensity on the detector 13. This central spot would involve a relatively high electronic noise and therefore a lower resolution of the intensity measurement of the observed image. The shutter element 25 is formed in an x-ray opaque material, for example made of lead. When the x-ray beam 14 is collimated, the dimensions of the shutter element 25 may be equal to or slightly larger than the corresponding dimensions of the opening of the first diaphragm 23.

The first diaphragm 23, the second diaphragm 24 (or the collimator) and the shutter element 25 may form a one-piece unit. The reference sample 22 may also be integral with these optical elements.

Figure 4:
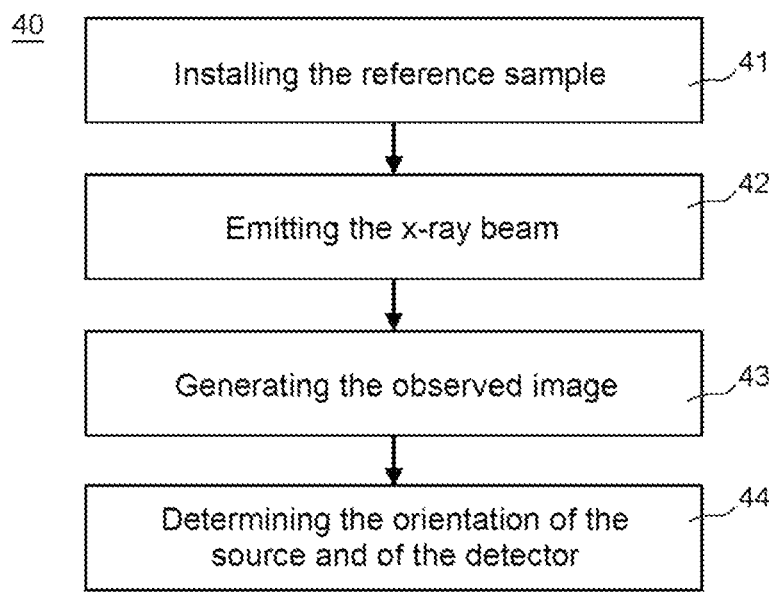
FIG. 4 shows an example of method for measuring angles of orientation of the x-ray imaging system according to the invention.

FIG. 4 shows an example of method for measuring angles of orientation of the x-ray imaging system 10 shown in FIG. 1. The method 40 comprises a step 41 of installing the reference sample 22, a step 42 of emitting the x-ray beam 14, a step 43 of generating the observed image and a step 44 of determining the orientation of the source and of the detector.

During step 41, the reference sample 22 is installed on the sample holder 12 so that one of its crystal planes is parallel with the plane YZ. The radiation source 11 may then be controlled by the processing unit 21 in step 42 in order to emit the polychromatic x-ray beam 14 according to the main axis of propagation $X_s$. At the same time, the processing unit 21 may control the x-ray detector 13 in step 43 so that it generates the observed image, said image comprising the diffraction pattern produced by the reference sample 22. Finally, during step 44, the processing unit 21 determines the orientation of the main axis of propagation $X_s$, defined by the angles $\xi_{xy}$ and $\xi_{xz}$ as well as the orientation of the sensing area 131 of the x-ray detector 13, defined by the angles $\alpha$, $\beta$ and $\gamma$. As indicated above, these orientations are determined by comparing the observed image with at least one target image including a diffraction pattern obtained for the reference sample with a preset orientation of the main axis of propagation $X_s$ of the source 11 and a preset orientation of the sensing area 131 of the x-ray detector 13.

According to a first embodiment, the determination of the orientation of the source 11 and of the detector 13 comprises a first step of determining the position of the centroids of the spots of the diffraction pattern in the observed image and a second step of comparing the observed image with a predetermined set of target images. Each target image shows a diffraction pattern obtained with the reference sample 22 for a preset orientation of the main axis of propagation $X_s$ and for a preset orientation of the sensing area 131. The orientations are different for each target image, so that the set of target images provides a representative sample of the diffraction patterns likely to be obtained with the x-ray imaging system 10. The comparison of the observed image with a target image involves for example determining an average of the distances between the centroid of each spot in the observed image and the centroid of each corresponding spot in the target image. The angles $\xi_{xy}$ and $\xi_{xz}$ as well as the angles $\alpha$, $\beta$ and $\gamma$ are then determined as being those associated with the target image for which the average of the distances is the lowest. This target image has the diffraction pattern that best corresponds to the diffraction pattern of the observed image.

The various target images may be obtained by a digital modelling of the diffraction generated by the reference sample 22 installed on the sample holder 12, for a preset orientation of the main axis of propagation $X_s$ (angles $\xi_{xy}$ and $\xi_{xz}$) and a preset orientation of the sensing area 131 of the detector 13 (angles $\alpha$, $\beta$ and $\gamma$). This digital modelling is for example performed with the aid of Laue diffraction modelling software such as the PyMicro software. Alternatively, the target images may be generated with the aid of a calibrated x-ray imaging system and of which the orientations of the source and of the detector are accurately controlled and measured. The position of the centroids of the spots of the diffraction pattern in each target image may be determined as those of the centroids of the spots of the diffraction pattern in the observed image.

Figure 5:
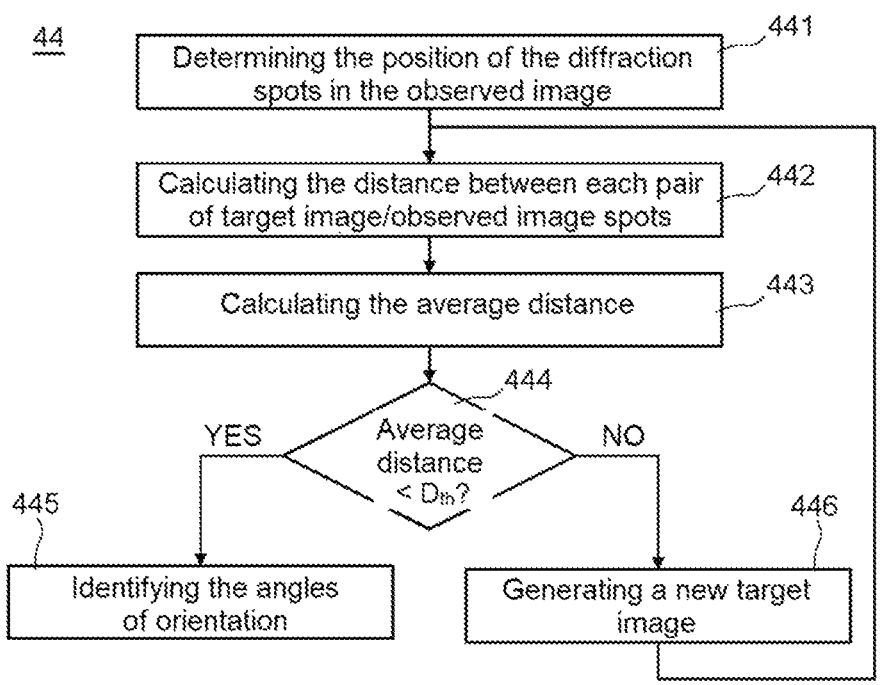
FIG. 5 shows a particular embodiment of a step of determining the orientation of the main axis of propagation of the x-ray source and of the orientation of the orthogonal mark related to the x-ray detector in the method shown in FIG. 4.

FIG. 5 shows a second embodiment of the step 44 of determining the orientation of the main axis of propagation $X_s$ and of the sensing area 131 of the x-ray detector 13. In this embodiment, an iterative process is applied from an initial target image. More specifically, in a first substep 441, the position of the centroids of the diffraction spots in the observed image is determined, in a similar way to the first embodiment. In a second substep 442, a distance between the centroid of each spot of the diffraction pattern in the observed image and the centroid of the corresponding spot in the target image considered—namely the initial target image during the first occurrence of substep 442—is calculated. In a third substep 443, an average distance is calculated, the average distance being an average of the distances between the various spots in the observed image and the corresponding spots in the target image considered. In a fourth substep 444, the average distance is compared with a threshold distance $D_{th}$. The threshold distance $D_{th}$ is determined depending on the accuracy desired for measuring the angles $\xi_{xy}$, $\xi_{xz}$, $\alpha$, $\beta$ and $\gamma$. If the average distance is less than the threshold distance $D_{th}$, the angles $\xi_{xy}$, $\xi_{xz}$, $\alpha$, $\beta$ and $\gamma$ associated with the target image considered are identified, in a substep 445, as being those defining the orientation of the source 11 and of the detector 13. On the other hand, if during substep 444, it is determined that the average distance is greater than or equal to the threshold distance $D_{th}$, a new target image is generated in a substep 446 and substeps 442, 443 and 444 are reiterated with this new target image. The new target image is generated with an orientation of the main axis of propagation of the source 11 different from the orientation of the current target image and/or with an orientation of the sensing area 131 of the detector 13 different from the orientation of the current target image. Preferably, the angles $\xi_{xy}$, $\xi_{xz}$, $\alpha$, $\beta$ and $\gamma$ are selected in such a way as to generate a new target image different from all of the preceding target images. Moreover, the angles $\xi_{xy}$, $\xi_{xz}$, $\alpha$, $\beta$ and $\gamma$ may be selected depending on the average distance calculated for the current target image or on the various average distances calculated for the preceding target images.

It should be noted that, in the description above, it has been considered that the reference sample 22 was aligned with the reference mark XYZ, and particularly with the optical axis X of the x-ray imaging system 10. Nevertheless, the invention also applies when this condition is not met. Additional angles defining the orientation of the reference sample then need to be determined. For the embodiment involving a comparison with the diffraction patterns of a set of target images, this involves having a larger library of images, taking as additional degrees of freedom the angle or angles defining the orientation of the reference sample 22.

On the other hand, in the two embodiments of the step 44 of determining the orientation of the x-ray source 11 and the orientation of the x-ray detector 13, it has been considered that the observed image was compared to a target image based on the position of the centroids of the spots of their diffraction pattern. Nevertheless, instead of centroids, it is possible to take into account another point of the diffraction spots. Furthermore, the comparison of the observed image with a target image may take into account other properties of the diffraction patterns, such as the shape of the spots.

What is claimed is:

1. A method of measuring angles of orientation of an x-ray imaging system, the x-ray imaging system comprising an x-ray source, an x-ray detector and a sample holder arranged to receive a sample to be analysed or a reference sample, the x-ray imaging system being arranged so that the x-ray source can emit a polychromatic x-ray beam along a main axis of propagation passing through the sample to be analysed and reaching a sensing area of the x-ray detector, an optical axis of the x-ray imaging system being defined between a centre of the x-ray source and the x-ray detector, the method comprising the steps of:
   emitting, from the x-ray source, the polychromatic x-ray beam along the main axis of propagation, so that the polychromatic x-ray beam passes through the reference sample installed on the sample holder and forms a diffraction pattern on the sensing area of the x-ray detector,
   generating, with the x-ray detector, an observed image, the observed image comprising the diffraction pattern,
   obtaining at least one target image, the at least one target image including a diffraction pattern obtained for the reference sample with a preset orientation of the main axis of propagation and a preset orientation of the sensing area of the x-ray detector, and
   determining the orientation of the main axis of propagation and the orientation of the sensing area of the x-ray detector by comparing the observed image with the at least one target image.

2. The method according to claim 1, wherein the step of determining the orientation of the main axis of propagation and the orientation of the sensing area of the x-ray detector comprises comparing the observed image with a set of target images, each target image showing the diffraction pattern for the preset orientation of the main axis of propagation and the preset orientation of the sensing area of the x-ray detector, said orientations being different for each target image.

3. The method according to claim 1, wherein the step of determining the orientation of the main axis of propagation and the orientation of the sensing area of the x-ray detector comprises the substeps of:
   determining a similarity parameter representative of a degree of similarity between the diffraction pattern of the observed image and the diffraction pattern of a current target image for a given orientation of the main axis of propagation and a given orientation of the sensing area of the x-ray detector,
   comparing the similarity parameter with a similarity threshold,
   when the similarity parameter is less than the similarity threshold, identifying the given orientation of the main axis of propagation and the given orientation of the sensing area of the x-ray detector as effective orientations of the main axis of propagation and of the sensing area of the x-ray detector, and
   when the similarity parameter is greater than or equal to the similarity threshold, generating a new current target image, at least one of the given orientations for the current target image being different from the corresponding given orientation for the preceding target image, and reiterating the preceding substeps until the similarity parameter is less than the similarity threshold.

4. The method according to claim 1 further comprising prior to the step of emitting the x-ray beam, a step of installing the reference sample on the sample holder.

5. The method according to claim 1, wherein the reference sample is made of silicon.

6. A non-transitory computer-readable storage medium storing a computer program comprising instructions that, when the program is executed by a computer, cause the computer to implement the method according to claim 1.

7. The method according to claim 2, wherein each target image is determined by a digital modelling of the diffraction generated by the reference sample installed on the sample holder, for a given orientation of the main axis of propagation and a given orientation of the sensing area of the x-ray detector.

8. A device for measuring angles of orientation of an x-ray imaging system, the x-ray imaging system comprising an x-ray source, an x-ray detector and a sample holder arranged to receive a sample to be analysed or a reference sample, the x-ray imaging system being arranged so that the x-ray source can emit a polychromatic x-ray beam along a main axis of propagation passing through the sample to be analysed and reaching a sensing area of the x-ray detector, an optical axis of the x-ray imaging system being defined between a centre of the x-ray source and the x-ray detector, the device comprising a processing unit configured to:

cause the x-ray source to emit the polychromatic x-ray beam along the main axis of propagation, so that the polychromatic x-ray beam passes through the reference sample installed on the sample holder and forms a diffraction pattern on the sensing area of the x-ray detector, generate, with the x-ray detector, an observed image, the observed image comprising the diffraction pattern, obtaining at least one target image, the at least one target image including a diffraction pattern obtained for the reference sample with a preset orientation of the main axis of propagation and a preset orientation of the sensing area of the x-ray detector, and determine the orientation of the main axis of propagation of the sensing area of the x-ray detector by comparing the observed image with the at least one target image.

9. The device according to claim 8 further comprising a first diaphragm placed upstream of the sample holder, and arranged to limit a transverse area of the x-ray beam.

10. The device according to claim 8 further comprising a shutter element placed downstream of the sample holder, and arranged to prevent a portion of the x-ray beam having passed through the reference sample without being diffracted, from reaching the sensing area of the x-ray detector.

11. The device according to claim 8 further comprising the reference sample.

12. The device according to claim 8, wherein the reference sample is made of silicon.

13. The device according to claim 9, wherein the first diaphragm includes an opening a transverse area of which is smaller than a transverse area of the reference sample.

14. The device according to claim 9 further comprising a second diaphragm and/or a collimator placed between the x-ray source and the first diaphragm, arranged to obtain a collimated x-ray beam at the sample holder.

* * * * *